Aug. 25, 1964   J. W. HOLZMAN   3,146,000
ADJUSTABLE VEHICLE FRAME
Filed May 2, 1962   2 Sheets-Sheet 1

United States Patent Office 3,146,000
Patented Aug. 25, 1964

3,146,000
ADJUSTABLE VEHICLE FRAME
James W. Holzman, Muhlenberg Park, Pa., assignor to Dana Corporation, Toledo, Ohio, a corporation of Virginia
Filed May 2, 1962, Ser. No. 191,793
2 Claims. (Cl. 280—81)

This invention relates to vehicle frames in general and more specifically to a vehicle frame constructed so as to permit the adjustment thereof to obtain a properly balanced condition.

Modern day tractors and trailers must be adapted to carry loads which vary greatly in weight and volume. These vehicles cannot always be loaded equally throughout their length with the result that the loads bearing on the wheels supporting the vehicle are not always uniform. Prior art devices have been devised to accommodate this unbalanced load condition. One such device, which has performed the function in a satisfactory manner, consists of mounting the vehicle axles on a sub-frame and providing means for varying the attachment location of the sub-frame to the vehicle so that by varying this attachment the distribution of load may be equalized.

The prior art devices for accomplishing this varying of attachment of necessity must be adjustable while the vehicle is loaded, for it is only at this time that the operator of the vehicle can determine the correct position for equally distributing the load. Since this variation of position must be accomplished when the vehicle is loaded, the means connecting the sub-frame to the vehicle must be adapted to allow such adjustment in a relatively easy manner while under the influence of a substantial load. Such means have taken the form of anti-friction wear blocks, positioned between the rails of the sub-frame and the main frame, made of brass or nylon, substantially cylindrical rollers rotatably mounted on one of the members and rollingly engaging the other member, and skids made of a suitable material. However, these prior art devices do not center the frames when the adjustment is being made so that undue friction occurs between the members. Also, the members tend to freeze fast, collect mud and dirt which wears them out and makes them hard to move and further normally require the application of grease in an exposed location so that the grease collects road dirt, thereby becoming abrasive and sticky.

It is, therefore, an object of this invention to provide a load carrying means for adjustably connecting the sub-frame and main frame of a vehicle which means will allow simple and easy relative movement between the frames.

It is also an object of this invention to provide such a device which while allowing easy adjustment between the frame members will simultaneously center the same.

It is another object of this invention to provide a single means which simultaneously centers adjustable frame members while allowing simple and low friction movement therebetween.

It is a further object of this invention to provide such a device which will not freeze fast, collect mud and dirt, and will operate satisfactorily under all operating conditions.

It is a still further object of this invention to provide such a device which is simple to manufacture, easy to maintain, and extremely durable so that long life is obtained therefrom.

Other objects and advantages of this invention will become apparent from a consideration of the following detailed description taken in conjunction with the accompanying drawings wherein.

Figure 1:
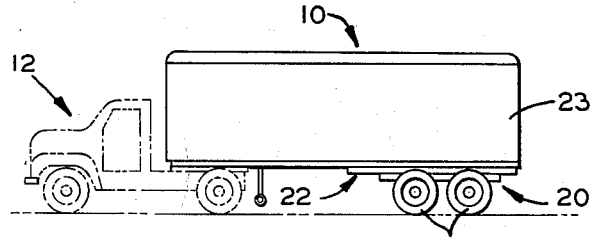
FIG. 1 is a side elevational view of a vehicle embodying this invention.
Figure 4:
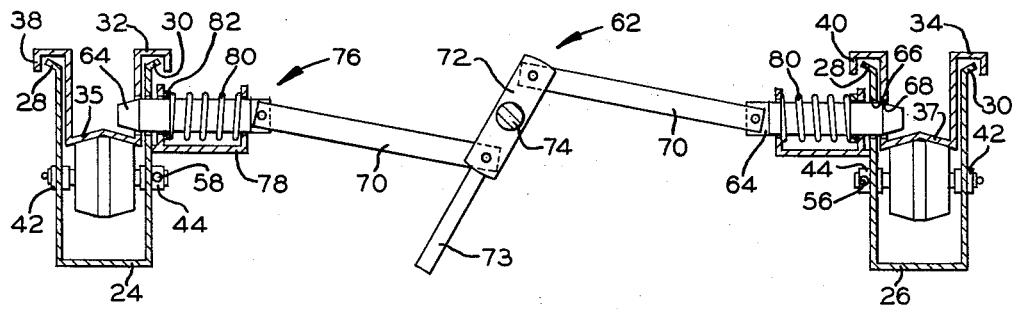
FIG. 4 is a view taken along the line 4—4 in FIG. 3.
Figure 5:
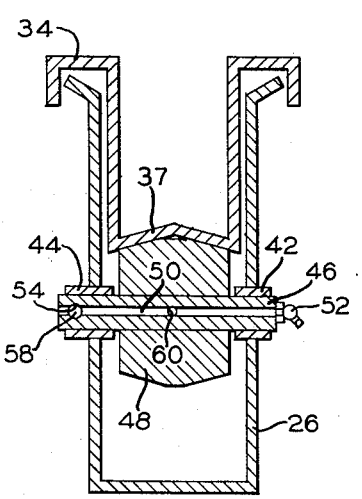
FIG. 5 is an enlarged sectional view of one of the anti-friction centering means of FIG. 4.

In one preferred embodiment of this invention the channel members constituting the main frame of a vehicle are each slidably disposed in a cooperating channel of the vehicle sub-frame. Roller means are rotatably carried on the sub-frame and rollingly engage the portion of the main frame projecting into the sub-frame. The surface of the roller and the engaging portion of the main frame are adapted so that the engagement therebetween tends to center the frames relative to each other. Means in the form of a spring loaded pin are provided to lockingly secure the main frame and sub-frame together after they have been relatively positioned as desired.

Referring now to the drawings, and particularly FIGS. 1–5, a vehicle in the form of a trailer shown generally at 10 adapted to be conveyed by a tractor shown in phantom at 12 is supported for mobility by a pair of ground wheels 14. The wheels 14 are rotatably mounted on axles 16 which in turn are suspended from springs 18 carried by a sub-frame 20. The sub-frame 20 carries the main frame 22 of the vehicle which in turn supports the load carrying structure 23 which is suitably secured thereto.

The sub-frame 20 includes a pair of laterally spaced longitudinally extending channel members 24 and 26 which are interconnected by a plurality of laterally extending channel members 27 suitably secured at their ends to the channel members 24 and 26. Each channel member 24 and 26 is of substantially U-shape configuration with the open portion disposed vertically upwardly and each having lip portions 28 and 30 respectively extending angularly therefrom.

Figure 3:
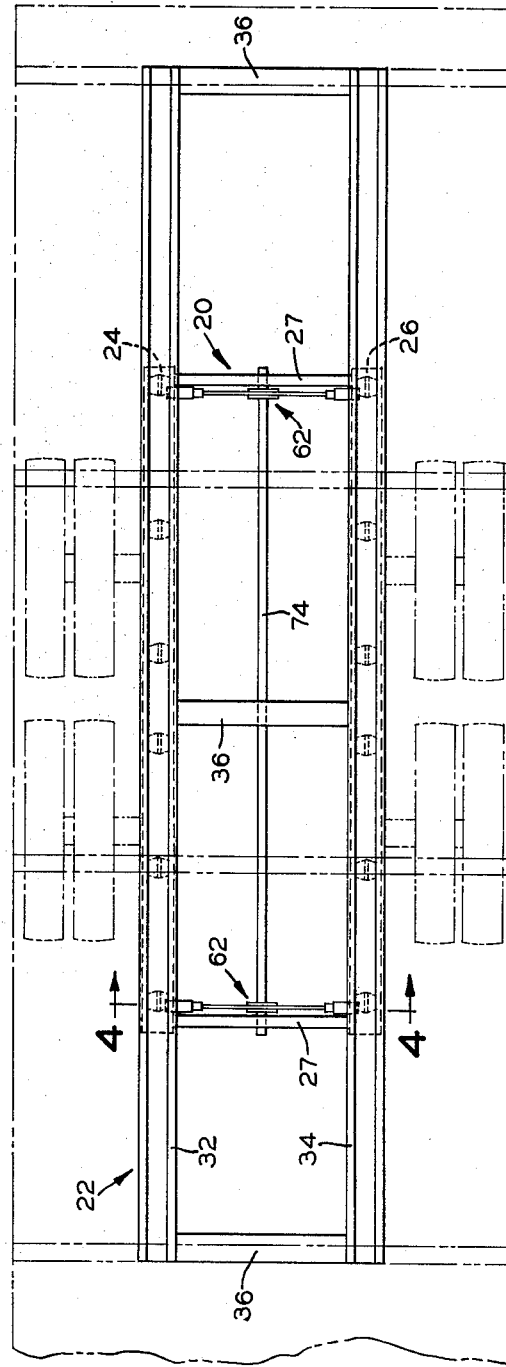
FIG. 3 is a plan view of the embodiment shown in FIG. 2.

The main frame 22, as shown in FIG. 3, is of substantially greater longitudinal size than the sub-frame 20 and includes a pair of laterally spaced longitudinally extending channel members 32 and 34 interconnected by a plurality of laterally extending channel members 36. The channel members 32 and 34 are of substantially U-shape configuration with the open portion in a vertically upward position.

The channel members 32 and 34 of the main frame 22 are slidably received in the channel member 24 and 26 of the sub-frame 20 respectively in a nested relationship. The channel members 32 and 34 are provided with lip portions 38 and 40 respectively, which lip portions extend transversely beyond the lip portions 28 and 30 of the channel members 24 and 26 and depend therebelow, thereby providing a labyrinth type seal at the open junction of the channels 24 and 32 and 26 and 34. This labyrinth seal will inhibit the ingress of foreign matter into the area between the channel members.

A plurality of longitudinally spaced bushings 42 and 44 are carried by the channel members 24 and 26 in aligned paired relationship. The bushings 42 and 44 are suitably secured to the channel members as by welding. A cross shaft 46 is pressed into each pair of bushings 42 and 44 and fixedly positioned therein. As clearly shown in FIGS. 4 and 5, each cross shaft 46 rotatably mounts a roller 48 of double conical convex construction. Each cross shaft 46 is provided with an axial opening 50 extending completely therethrough. One end of each opening 50 threadedly carries a Zerk fitting 52 adapted for the pressurized lubrication thereof.

The other end of each cross shaft 46 is provided with a transverse opening 54 which is aligned with an opening 56 in each bushing 44 and adapted to have a pin 58 pressed therethrough. The openings 54 and 56 and pin 58 are larger than the opening 50 in the cross shaft 46 so that the pin 58 suitably blocks the open end of the shaft 46 while simultaneously fixing the shaft 46 against movement relative to the bushings 42 and 44. Medially positioned in the cross shaft 46 is a transversely extending lubricant passageway 60 so that lubricant injected into the opening 50 in the shaft 46 through the Zerk fitting 52 may pass through the lubricant passageway 60 thereby lubricating the engagement between the roller 48 and the cross shaft 46.

The transversely extending lower portions 35 and 37 of the channel members 32 and 34 respectively are deformed in a concave manner so as to conform to the configuration of the double conical rollers 48 so that substantially full face engagement is obtained therebetween. In this manner it is seen that the channel members 32 and 34 rollingly engage the rollers 48 carried by the channel members 24 and 26 respectively, and that by means of the fall face engagement of the conical surfaces of the rollers 48 and the cooperating surface 35 and 37 on the channel members 32 and 34, the channel members are constantly centered and clearance is always maintained between the vertically extending walls of the channels.

A pair of locking means shown generally at 62 are provided at the opposite longitudinal ends of the sub-frame 20. More specifically each locking means comprises a pair of lock pins 64 slidably received in aligned openings 66 and 68 in the sub-frame 20 and main frame 22 respectively. The lock pins 64 are each pivotally attached at their inner ends to a connecting rod 70, which connecting rods are each pivotally connected at their inner ends to opposite ends of a double crank mechanism 72. The double crank mechanism 72 is provided with a handle 73 for the actuation thereof. Each double crank 72 is rotatably mounted on a longitudinally extending rod 74 which is suitably carried by the channel members 27 of the sub-frame 20.

Each pin 64 is provided with a spring loading means shown generally at 76. The spring loading means include a U-shape bracket 78 suitably secured to the inner wall of the channel members 24 and 26 of the sub-frame 20. A compression coil spring 80 is disposed about the pin 64 and has the inner end thereof abuttingly engaging the U-shape bracket 78 and the outer end thereof abuttingly engaging a snap ring 82 secured to the pin 64. The coil springs 80 are adapted to constantly bias the pins 64 outwardly toward the locked position and must be compressed to withdraw the pin 64 from the aligned openings 66 and 68 by means of counterclockwise movement of the double crank mechanism 72. Return of the crank 72 to the position shown in FIG. 4 allows the springs 80 to again bias the pins 64 to the engaged position.

Figure 6:
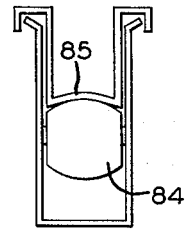
FIGS. 6, 7, 8 and 9 are further embodiments of the anti-friction and centering means shown in FIG. 5.

Referring to FIGS. 6, 7, 8 and 9, other embodiments of the roller configuration are shown in full. FIG. 6 discloses a barrel-shape roller 84 having a spherical surface which engages a cooperating surface formed on the transverse portion 85 of the channel members of the main frame 22. This roller also provides for centralization of the channel members and rolling engagement between the sub-frame 20 and main frame 22.

Figure 7:
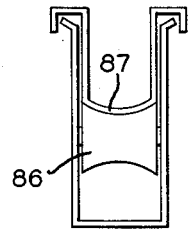
Figure 8:
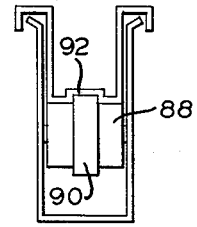

FIG. 7 discloses a roller 86 having a concave surface which likewise provides for centralization and rolling engagement between the sub-frame 20 and the cooperating convex surface 87 of the frame 22. FIG. 8 discloses a roller 88 of substantially cylindrical form having a circumferential shoulder 90 thereon disposed in a medial position. The channel members of the main frame include a rib portion 92 adapted to cooperate with the shoulder 90 for centralizing the channel members of the main frame and sub-frame relative to each other while the roller 88 provides for rolling engagement therebetween.

Figure 9:
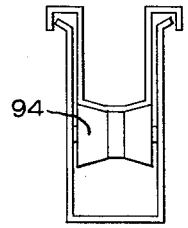
Figure 2:
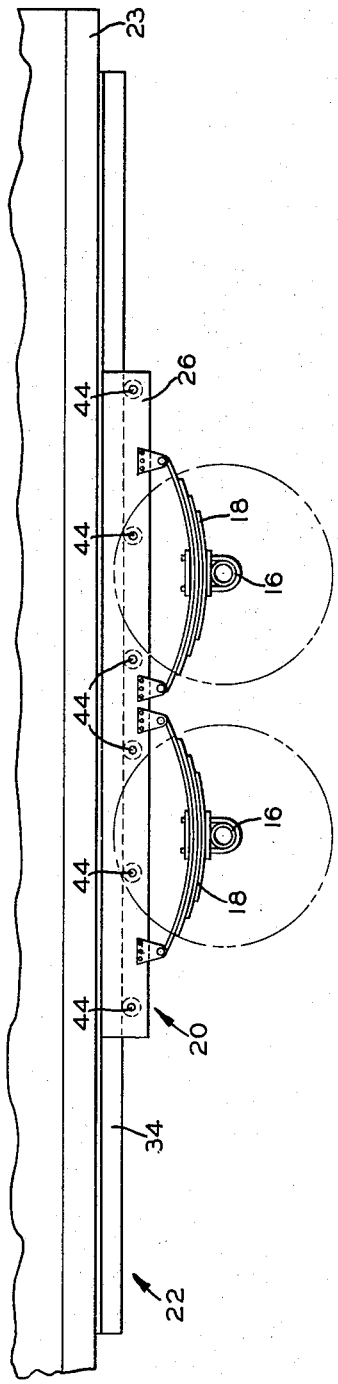
FIG. 2 is a side elevational view of the main frame and sub-frame of the vehicle shown in FIG. 2.

FIG. 9 discloses a roller 94 having a double conical surface. The surface is formed so that the apexes of the cones are facing each other resulting in a concave configuration. The channel members of the sub-frame 22 are adapted to conform with the roller 94 thereby centralizing the channel members while providing for rolling engagement therebetween.

From the foregoing it is apparent that means have been provided for adjustably connecting the sub-frame and main frame of a vehicle which will allow simple and easy relative movement therebetween; which means will simultaneously center the sub-frame and main frame of the vehicle; which will allow simple and low friction movement between the sub-frame and main frame; and which will not freeze fast, collect mud and dirt, and which will operate satisfactorily under all conditions.

The preferred embodiments of this invention have been shown and described, but changes and modifications can be made, and it is understood that this description is illustrative only and not for the purpose of rendering this invention limited to the details illustrated or described except insofar as they have been limited by the terms of the following claims.

What is claimed:

1. A vehicle frame comprising in combination,
   (a) a sub-frame supported by wheel and axle means and including a first pair of laterally spaced longitudinally extending channel members of U-shaped configuration with the open portion thereof positioned vertically upwardly,
   (b) each of said channel members including a pair of laterally spaced vertically extending side walls and a base portion interconnecting the lower portion of said side walls,
   (c) means securedly interconnecting said pair of channel members,
   (d) a main frame carrying a superstructure thereon and including a second pair of laterally spaced longitudinally extending channel members of U-shaped configuration with the open portion thereof positioned vertically upwardly and each channel member of said pair of channel members being in a movable nested cooperative relationship respectively with one of said first pair of channel members,
   (e) each of said second pair of channel members including a pair of laterally spaced vertically extending side walls and an engaging base portion interconnecting the lower portion of said side walls,
   (f) said main frame being substantially greater in longitudinal size than said sub-frame,
   (g) a plurality of longitudinally extending lips with one lip of said plurality of lips being carried by the upper portion of each of said side walls of said second pair of channel members and overlapping and closely adjacent to the upper portion of the respective side wall of the cooperative member of said first pair of channel members for excluding the ingress of contaminants therebetween,
   (h) said side walls of each of said first channel members being spaced from and free from engagement with said side walls of said second channel member cooperating therewith,
   (i) a plurality of rollers of varying cross-section carried by said first pair of channel members at a position below the vertically upper portion thereof and with the vertically upper surface of said rollers being disposed below the upper portion thereof and rollingly and supportingly engaging the base portion of said second pair of channel members nested therein,
   (j) the base portion of said pair of channel members engaging said rollers projecting vertically below the upper portion of said second channel members and being of a configuration conforming to the engaging periphery of said rollers, (k) and locking means carried by said members and adapted to securely position said frames relative to each other, (l) whereby said frames are rollingly and supportingly connected and centered by said rollers and said rollers are protected from contaminants by said frame.

2. The vehicle frame defined in claim 1 wherein the engaging surface of said rollers when viewed in cross-section is concave.

References Cited in the file of this patent

UNITED STATES PATENTS

| | | |
|---|---|---|
| 555,081 | Edmond | Feb. 25, 1896 |
| 1,320,601 | Caron | Nov. 4, 1919 |
| 2,589,678 | De Lay | Dec. 14, 1952 |
| 2,818,272 | De Lay | Dec. 31, 1957 |
| 2,841,411 | Sheppard et al. | July 1, 1958 |
| 2,935,332 | De Lay | May 3, 1960 |
| 2,949,863 | Cozzoli | Aug. 23, 1960 |

FOREIGN PATENTS

| | | |
|---|---|---|
| 1,170,612 | France | Sept. 22, 1958 |